US007136919B1

(12) United States Patent
Foncarnier

(10) Patent No.: US 7,136,919 B1
(45) Date of Patent: Nov. 14, 2006

(54) METHOD AND SYSTEM FOR BROADCASTING ALARM MESSAGES TO SELECTED USERS OF AN IP NETWORK

(75) Inventor: Olivier Foncarnier, Vence (FR)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 09/407,738

(22) Filed: Sep. 28, 1999

(30) Foreign Application Priority Data

Oct. 8, 1998 (EP) .................................. 98480066

(51) Int. Cl.
*G06F 15/173* (2006.01)
*G06F 15/16* (2006.01)
*G06F 11/00* (2006.01)
*G06F 9/46* (2006.01)

(52) U.S. Cl. ...................... 709/224; 709/223; 709/200; 714/48; 705/8; 705/9

(58) Field of Classification Search ................ 709/223, 709/224; 707/513; 340/506
See application file for complete search history.

(56) References Cited

U.S. PATENT DOCUMENTS

| 5,331,549 | A | * | 7/1994 | Crawford, Jr. .............. 600/513 |
|---|---|---|---|---|
| 5,339,392 | A | | 8/1994 | Risberg et al. ............. 395/161 |
| 5,819,284 | A | * | 10/1998 | Farber et al. ................ 709/203 |
| 5,845,213 | A | * | 12/1998 | Sumner et al. ............. 455/458 |
| 5,897,635 | A | * | 4/1999 | Torres et al. ................. 707/10 |
| 5,941,996 | A | * | 8/1999 | Smith et al. .................. 714/47 |
| 5,953,732 | A | * | 9/1999 | Meske et al. ................ 715/513 |
| 5,977,964 | A | * | 11/1999 | Williams et al. ............ 345/721 |
| 5,982,507 | A | * | 11/1999 | Weiser et al. ............... 358/438 |
| 6,006,016 | A | * | 12/1999 | Faigon et al. ................. 714/48 |
| 6,021,262 | A | * | 2/2000 | Cote et al. .................... 714/48 |
| 6,038,542 | A | * | 3/2000 | Ruckdashel ..................... 705/9 |
| 6,045,206 | A | * | 4/2000 | Igval ............................. 347/2 |
| 6,057,758 | A | * | 5/2000 | Dempsey et al. ...... 340/539.12 |
| 6,058,420 | A | * | 5/2000 | Davies ........................ 709/224 |
| 6,085,191 | A | * | 7/2000 | Fisher et al. ................... 707/9 |
| 6,131,118 | A | * | 10/2000 | Stupek et al. ............... 709/223 |
| 6,147,977 | A | * | 11/2000 | Thro et al. ................... 370/265 |
| 6,154,128 | A | * | 11/2000 | Wookey et al. ............. 340/506 |
| 6,185,609 | B1 | * | 2/2001 | Rangarajan et al. ........ 709/219 |

(Continued)

FOREIGN PATENT DOCUMENTS

EP          0738961          10/1996

(Continued)

OTHER PUBLICATIONS

Drala Software, "Event Notifier, a Pattern for Event Notification", Jul. 1998, SIGS Publications, Java report, vol. 3, No. 7, pp. 1-17.*

(Continued)

*Primary Examiner*—Bunjob Jaroenchonwanit
*Assistant Examiner*—Philip C. Lee
(74) *Attorney, Agent, or Firm*—Yee & Associates, P.C.; A. Bruce Clay

(57) ABSTRACT

A system broadcast alarm messages from a server to a list of users among a plurality of multi-platform users sharing the server in a data transmission network which operates under Internet Protocol (IP) and uses the Java language. The system comprises a profile table containing the profiles of each user, a processing unit and a message sender enabling an administrator associated with the server to transmit alarm messages to the users of the list wherein the users have been selected by selecting profiles in the profile table. The alarm messages are displayed on the screen of the workstation associated with each selected user if this workstation is running.

21 Claims, 1 Drawing Sheet

U.S. PATENT DOCUMENTS

| | | |
|---|---|---|
| 6,188,407 B1* | 2/2001 | Smith et al. .................. 345/841 |
| 6,282,268 B1* | 8/2001 | Hughes et al. ........... 379/88.03 |
| 6,282,568 B1* | 8/2001 | Sondur et al. .............. 709/223 |
| 6,349,333 B1* | 2/2002 | Panikatt et al. ............. 709/223 |
| 6,363,140 B1* | 3/2002 | Pinard ...................... 379/88.22 |
| 6,571,279 B1* | 5/2003 | Herz et al. .................. 709/217 |
| 6,603,396 B1* | 8/2003 | Lewis et al. ................. 340/506 |
| 2001/0047371 A1* | 11/2001 | Kawasaki et al. .......... 707/511 |
| 2002/0049818 A1* | 4/2002 | Gilhuly et al. .............. 709/206 |
| 2002/0082892 A1* | 6/2002 | Raffel et al. .................... 705/8 |
| 2003/0036974 A1* | 2/2003 | Allen ........................... 705/27 |
| 2003/0050987 A1* | 3/2003 | Lazaridis et al. ........... 709/206 |

FOREIGN PATENT DOCUMENTS

| | | |
|---|---|---|
| WO | 9727546 | 7/1997 |

OTHER PUBLICATIONS

Rifkin et al., "the Evolution of Internet-Scale Event Notification Services: Past, Present, and Future", Aug. 10, 1998, www.cs.caltaech.edu/~adam/isen/wacc/, p. 1-13.*

Collinson, P., "Network Flight Recorder" Centaur Communications. vol. 13, No. 2. Jul. 1998, pp. 47-52 XP-002128934.

* cited by examiner

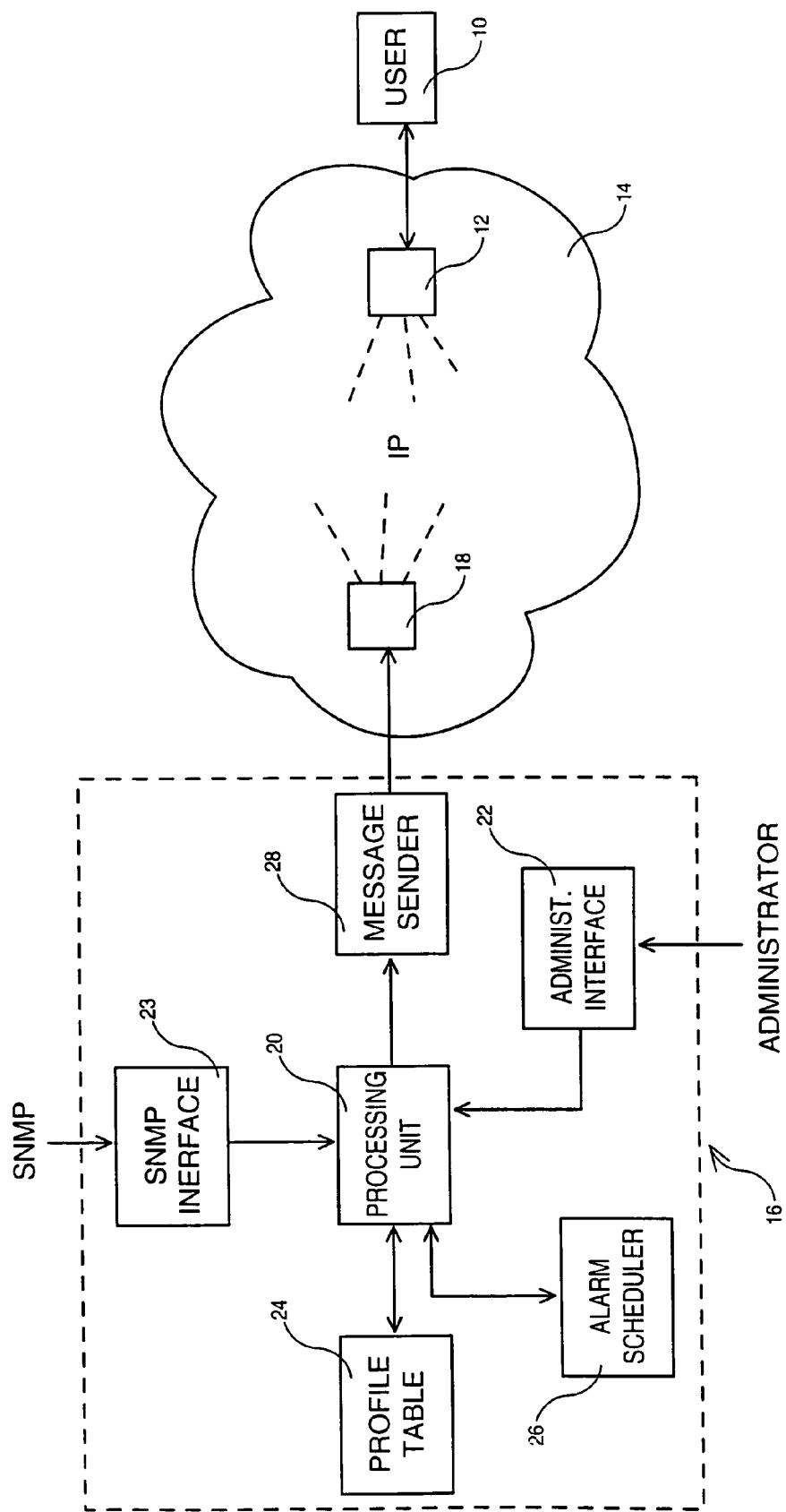

METHOD AND SYSTEM FOR BROADCASTING ALARM MESSAGES TO SELECTED USERS OF AN IP NETWORK

TECHNICAL FIELD

The invention relates to the heterogeneous data transmission networks which can be shared by multi-platform users by means of a language tool of the Java type, and particularly to a system for broadcasting alarm messages to selected users of such a network.

BACKGROUND

The data transmission network based upon the Internet Protocol (IP) is becoming a universal network used by more and more people in the world. Since the users interconnected by such a network were operating on different platforms, there was need for a language tool to allow the users to communicate together irregardless of the platform they were using. The Java language that emerged to meet this need is simple and can be easily programmed by most developers without extensive programmer training while being attuned to current software practices. The Java language is object oriented to take advantage of modern software development methodologies and to fit into distributed user-server applications. It is also multithreaded for high performance in applications that need to perform multiple concurrent activities such as multimedia.

The Java language is designed to support applications that are deployed into heterogeneous network environments wherein the application must be capable of executing on a variety of hardware architectures. Within this variety of hardware platforms, the applications can execute atop various operating systems (OS/2, Windows 95, Windows NT, AIX, etc.) and interoperate with multiple programming language interfaces.

Nevertheless, despite the powerful performance of the Java language, there is at present no tool that enables information or an alarm message to be forwarded from a server and to be displayed to one or more users operating on different platforms while these users are running an application.

SUMMARY OF THE INVENTION

Accordingly, the main object of the invention is to provide a system for broadcasting information and alarm messages to selected users in a heterogeneous data transmission network such as an IP network.

BRIEF DESCRIPTION OF THE DRAWING

For a more complete understanding of the present invention and for further advantages thereof, reference is now made to the following Detailed Description taken in conjunction with the accompanying Drawing, in which:

The FIGURE is a schematic block-diagram illustrating the present invention.

Another object of the invention is to provide a heterogeneous data transmission network such as an IP network wherein at least a server can broadcast information and alarm messages to a list of users defined by their profiles previously stored in a profile table.

Therefore, the invention relates to a system for broadcasting alarm messages from a server to a list of users among a plurality of multi-platform users sharing the server in a data transmission network operating under Internet Protocol (IP) and using the Java language. This system comprises a profile table which contains the profiles of each user, and processing and transmitting means which enable an administrator associated with the server to transmit alarm messages to the users of the list wherein the users have been selected by selecting profiles in the profile table, the alarm messages being displayed on the screen of the workstation associated with each selected user if the workstation is running

DETAILED DESCRIPTION OF THE INVENTION

The objects, features and advantages of the invention will become clear from the following description in reference to the accompanying FIG. 1 representing schematically a block-diagram of a user connected through an IP network to its server provided with a system for broadcasting messages according to the invention. As illustrated, a user application 10 is connected to a node 12 of an IP network 14 and can transmit data over the network to any other user application by using a server 16 connected to a node 18 of network 14.

Server 16 includes a Processing Unit 20 which handles the server and is also used to process all the operations controlled by an administrator entering the server via an administrator interface 22. Server 16 also comprises a System Network Message Protocol (SNMP) Interface 23 to monitor defined machines, a Profile Table 24 for the registration of the user profiles, an Alarm Scheduler 26 and a Message Sender 28 connected to node 18.

When a user is connected for the first time to the server, he provides data about the team in which he is integrated, his centers of interest, etc. which enable a profile to be created. Such a profile is registered in Profile Table 24 and can be used by the administrator to send messages to the user. Note that the profile can be modified at any time at the request of the user.

By means of a new application written in Java language (Java alarm program) and run by Processing Unit 20, messages can be sent to any user connected to server 16 such as User 10 whatever the platform he is using, AIX, SUM, OS/2, DOS, Windows 95, etc. The messages can be either manually sent, or automatically sent, or can be standalone alarm functions.

A message or an alarm can be manually sent when the server administrator writes the message (or alarm) on Administrator Interface 22 and initiates the transmission thereof to a list of users whose profile has been selected in Profile Table 24. Then, the message is sent by Message Sender 28 over the network to all running workstations corresponding to the selected profile. On the user workstation, the Java alarm program receives the message (or alarm) and displays it on the foreground on the user screen, and an alarm tune is also played. Once the message is read, the user presses the OK key and the program switches in the background. Then, the Java alarm program sends back to server 16 an acknowledgment which can be used for statistic purposes on the server.

Messages can also be generated automatically from server 16. In such a case, a message or an alarm is previously written by the administrator and stored in the memory of Processing Unit 20. At the same time, the administrator defines the profile of the users to which such a message or an alarm must be sent when a condition or an event occurs. Thus, the message can be used to monitor specific resources via SNMP Interface 23, an alert message being sent by Message Sender 28 when one of those resources comes down or becomes unavailable. Information messages can also be broadcast to a list of users when an event is triggered, such as the message <<staff meeting in 10 minutes>> sent to all members of a team every Monday at 9:50 am. For this type of alert message triggered by an event, the transmission of the message is scheduled in Alarm Scheduler 26 by the administrator.

The standalone alarm functions are used to detect when the server is out. In such a case, a message is scheduled in Alarm Schedule 26 to be regularly sent to the users.

If the user is no longer available, no message is received by the user who knows that the server is out of work.

The use of standalone alarm functions can be enhanced if the list of events and monitoring servers were downloaded directly into the Java alarm program at the beginning and refreshed once a change is made in the alarm server. An advantage is to determine more precisely the connection problem. For example, if the server is the only server which cannot be contacted, there is a server problem or if all the monitored servers cannot be contacted, there is a network problem and the message will be different.

What is claimed is:

1. System for broadcasting alarm messages from a server to a list of users among a plurality of multi-platform users sharing the server in a data transmission network operating under Internet Protocol (IP) and using Java language, said system being characterized in that it comprises:
   a profile table containing profiles of each one of said plurality of users; and
   processing and transmitting means enabling an administrator associated with said server to transmit alarm messages to the list of users wherein said users have been selected from said profile table, said alarm messages being displayed on a screen of a workstation associated with each selected user if said workstation is running, wherein said processing and transmitting means comprise a processing unit operating under the control of a Java alarm program and a message sender transmitting directly said alarm messages over said network.

2. The system according to claim 1, wherein said alarm messages are written and manually sent by the administrator when necessary.

3. The system according to claim 1, wherein said alarm messages previously written by the administrator are automatically sent by said processing and transmitting means at the occurrence of a condition or an event.

4. The system according to claim 3, wherein said alarm messages are automatically sent when any specific resource monitored by a Simple Network Management Protocol (SNMP) via a SNMP interface comes down or becomes unavailable.

5. The system according to claim 3, wherein said alarm messages are automatically sent at the occurrence of an event scheduled in an alarm scheduler by said administrator.

6. The system according to claim 1, wherein said alarm messages are standalone alarm functions used to detect when said server is out of work.

7. A method of broadcasting alarm messages from a server to a list of users among a plurality of multi-platform users sharing the server in a data transmission network operating under Internet protocol (IP) and using Java, comprising the steps of:
   profiling in a profile table each one of said plurality of users;
   processing an alarm message by an administrator associated with the server; and
   transmitting said alarm message to the list of users wherein said users have been selected from said profile table, said alarm message being displayed on a screen of a workstation associated with each selected user if said workstation is on, wherein said steps of processing and transmitting comprise operating a processing unit under the control of a Java alarm program and a message sender transmitting directly said alarm messages over said network.

8. The method according to claim 7, wherein said alarm messages are written and manually sent by the administrator when necessary.

9. The method according to claim 7, wherein alarm messages previously written by the administrator are automatically sent at the occurrence of a condition or an event.

10. The method according to claim 9, wherein said alarm messages are automatically sent when any specific resource monitored by a Simple Network Management Protocol (SNMP) via a SNMP interface comes down or is unavailable.

11. The method according to claim 9, wherein said alarm messages are automatically sent at the occurrence of an event scheduled in an alarm scheduler by said administrator.

12. The method according to claim 7, wherein said alarm messages are standalone alarm functions used to detect when said server is out of work.

13. A computer program product recorded on computer readable medium for broadcasting alarm messages from a server to a list of users among a plurality of multi-platform users sharing the server in a data transmission network operating under Internet Protocol (IP) and using Java language, comprising:
   computer readable means for creating a profile table containing profiles of each one of said plurality of users; and
   computer readable means for processing and for transmitting to enable an administrator associated with said server to transmit alarm messages to the list of users wherein said users have been selected from said profile table, said alarm messages being displayed on a screen of a workstation with each selected user if said workstation is running, wherein said computer readable means for processing and for transmitting comprise a processing unit operating under the control of a Java alarm program and a message sender transmitting directly said alarm messages over said network.

14. The program product according to claim 13, wherein said alarm messages are written and manually sent by the administrator when necessary.

15. The program product according to claim 13, wherein said alarm messages previously written by the administrator are automatically sent by said computer readable means for processing and for transmitting at the occurrence of a condition or an event.

16. The program product according to claim 15, wherein said alarm messages are automatically sent when any specific resource monitored by a Simple Network Management Protocol (SNMP) via a SNMP interface comes down or becomes unavailable.

17. The program product according to claim 15, wherein said alarm messages are automatically sent at the occurrence of an event scheduled in an alarm scheduler by said administrator.

18. The program product according to claim 13, wherein said alarm messages are standalone alarm functions used to detect when said server is out of work.

19. The system according to claim 1, said system being characterized in that it further comprises:
  selection means for selecting, in response to a condition or an event, a list of users based on profile information in the profile table wherein the list of users is a subset of the plurality of users.

20. The method according to claim 7, further comprising the steps of:
  selecting, in response to a condition or an event, a list of users based on profile information in the profile table wherein the list of users is a subset of the plurality of users.

21. The program product according to claim 13, further comprising:
  computer readable means for selecting, in response to a condition or an event, a list of users based on profile information in the profile table wherein the list of users is a subset of the plurality of users.

* * * * *